(12) United States Patent
Chen et al.

(10) Patent No.: US 7,035,657 B2
(45) Date of Patent: Apr. 25, 2006

(54) METHOD AND APPARATUS FOR SUPPORTING APPLICATION-LAYER MEDIA MULTICASTING

(75) Inventors: An Mei Chen, San Diego, CA (US); Eric C. Rosen, Solana Beach, CA (US)

(73) Assignee: Qualcomm Inc., San Diego, CA (US)

(*) Notice: Subject to any disclaimer, the term of this patent is extended or adjusted under 35 U.S.C. 154(b) by 421 days.

(21) Appl. No.: 10/142,369

(22) Filed: May 8, 2002

(65) Prior Publication Data

US 2003/0211859 A1    Nov. 13, 2003

(51) Int. Cl.
*H04B 7/00*    (2006.01)
(52) U.S. Cl. .................. 455/518; 455/519; 455/517; 455/520; 455/418; 455/422.1; 370/312; 370/432; 370/310.2; 370/338
(58) Field of Classification Search ............... 455/419, 455/558, 518, 517, 422.1, 519, 454, 520, 455/418; 370/352, 270, 312, 432, 310, 338; 713/163, 162
See application file for complete search history.

(56) References Cited

U.S. PATENT DOCUMENTS

| | | | | |
|---|---|---|---|---|
| 5,761,193 A * | 6/1998 | Derango et al. | ............ | 370/312 |
| 5,835,860 A | 11/1998 | Diachina | ................... | 455/458 |
| 5,862,329 A * | 1/1999 | Aras et al. | .................. | 709/204 |
| 6,115,613 A | 9/2000 | Jonsson | ....................... | 455/519 |
| 6,157,843 A * | 12/2000 | Derango et al. | ............ | 455/518 |
| 6,215,994 B1 * | 4/2001 | Schmidt et al. | ............. | 455/419 |
| 6,262,982 B1 * | 7/2001 | Donahue et al. | ............ | 370/352 |
| 6,330,671 B1 * | 12/2001 | Aziz | .......................... | 713/163 |
| 6,333,921 B1 | 12/2001 | Grube et al. | ................ | 370/312 |
| 6,360,076 B1 * | 3/2002 | Segura et al. | ............ | 455/67.11 |
| 6,370,153 B1 * | 4/2002 | Eng | ........................... | 370/438 |
| 6,377,560 B1 | 4/2002 | Dailey | ........................ | 370/329 |
| 6,490,586 B1 * | 12/2002 | Goft et al. | .................... | 707/10 |
| 6,493,716 B1 * | 12/2002 | Azagury et al. | ............. | 707/10 |
| 6,512,754 B1 * | 1/2003 | Feder et al. | ............... | 370/338 |
| 6,516,200 B1 * | 2/2003 | Schmidt et al. | ............ | 455/518 |
| 2001/0018341 A1 * | 8/2001 | Dao et al. | ................... | 455/418 |
| 2002/0031097 A1 * | 3/2002 | Jung | .......................... | 370/270 |
| 2003/0003938 A1 * | 1/2003 | O'Neill et al. | ............. | 455/519 |
| 2003/0016632 A1 * | 1/2003 | Refai et al. | ................ | 370/260 |
| 2003/0053457 A1 * | 3/2003 | Fox et al. | .................... | 370/390 |
| 2003/0207690 A1 * | 11/2003 | Dorenbosch | ............... | 455/445 |
| 2003/0228865 A1 * | 12/2003 | Terry | ....................... | 455/422.1 |
| 2004/0240466 A1 * | 12/2004 | Unitt et al. | ................ | 370/461 |

FOREIGN PATENT DOCUMENTS

WO        0069185        11/2000

* cited by examiner

*Primary Examiner*—Sonny Trinh
*Assistant Examiner*—Khai Nguyen
(74) *Attorney, Agent, or Firm*—Philip R. Wadsworth; Robert J. O'Connell; John L. Ciccozzi

(57) ABSTRACT

A method and apparatus for delivering media to a group of target communication devices provides for multicasting media to the group of target communication devices to save network resources. The disclosed embodiments provide for a significant reduction in network traffic and media processing time by transmitting media in multicast transport mode, where a single copy of the media destined for a group of target recipients is transmitted to a wireless infrastructure over the multicast path. The wireless infrastructure replicates and transmits one copy of the media to each of the target recipients that are assigned to dedicated channels, but multicasts one copy of the media to the target recipients that are assigned to a shared channel.

4 Claims, 6 Drawing Sheets

METHOD AND APPARATUS FOR SUPPORTING APPLICATION-LAYER MEDIA MULTICASTING

FIELD

The present invention relates to point to multi-point communications systems. More specifically, the present invention relates to methods and apparatus for supporting application-layer multicasting for streaming media to a group of target communication devices in a wireless communication network.

BACKGROUND

In a group call service a large number of group participants are usually concentrated in a small geographical area, e.g., a construction site. Setting up multiple point-to-point communication links for such group participants, who may be located in a single sector, is not feasible. The group participants could "hog" up all the resources available for that sector. This would cause a very high call-blocking rate experienced by other users. In addition, if the concentration of the group participants is high in a given sector, the network may not have enough resources to assign a dedicated channel to every group participant. Therefore, users may be denied access to the group call not because of having group membership problems but because of lack of available network resources. This problem creates a negative impact on the group call users.

Existing group call services require a group call server to replicate the media and transmit one copy to each group participant on individual point-to-point communication links. Having the group call server to replicate the media for transmission to all participants of a target group is a processor-intensive task and could be quite taxing on the server when the number of group participants is large. Having the group call server to send one copy of the media to each group participant increases network traffic on both the wireless infrastructure's radio access network (RAN) and the service provider's wide area network (WAN).

For example, a class of wireless services is intended for quick, efficient, one-to-one or one-to-many (group) communication. In general, these services have been half-duplex, where a user presses a "push-to-talk" (PTT) button on a phone/radio to initiate a group call. If granted the floor, the talker then generally speaks for a few seconds. After the talker releases the PTT button, other group members can request the floor. These services have traditionally been used in applications where one person, a "dispatcher," needs to communicate to a group of people, such as field service personnel or taxi drivers, which is where the "dispatch" name for the service comes from. Similar services have been offered on the Internet and are generally known as "voice chat."

There is a need, therefore, for mechanisms to save radio resources, to reduce the processing load of the server, and to reduce network traffic of both the wireless infrastructure's RAN and the service provider's WAN.

SUMMARY

The disclosed embodiments provide novel and improved methods and apparatus for delivering media to a group of target communication devices using an application-layer media multicasting mechanism to save network resources. In one aspect, a method and apparatus provides for multicasting media to a group of target communication devices in a wireless communication network, which includes a wireless infrastructure and a group call server (GCS). The method provides for multicasting one copy of the media from the GCS to the wireless infrastructure for transmission to the group of target communication devices. The method further provides for transmitting one copy of the media from the wireless infrastructure to each of a first plurality of target communication devices within a first cell or sector, and multicasting one copy of the media from the wireless infrastructure to a second plurality of target communication devices within a second cell or sector.

In one aspect, a method and apparatus for determining whether to multicast media to a group of target communication devices on a multicast path provides for determining a count of participants in the group of target communication devices, and multicasting the media to a wireless infrastructure for transmission to the group of the target communication devices, if the determined count exceeds a predetermined threshold.

In one aspect, an apparatus for delivering information to a group of target communication devices in a wireless communication system includes a memory unit, a receiver, a transmitter, and a processor communicatively coupled with the memory unit, the receiver, and the transmitter. The processor is capable of carrying out the above-mentioned methods.

BRIEF DESCRIPTION OF THE DRAWINGS

The features and advantages of the present invention will become more apparent from the detailed description set forth below when taken in conjunction with the drawings in which like reference characters identify correspondingly throughout and wherein.

DETAILED DESCRIPTION

Figure 1:
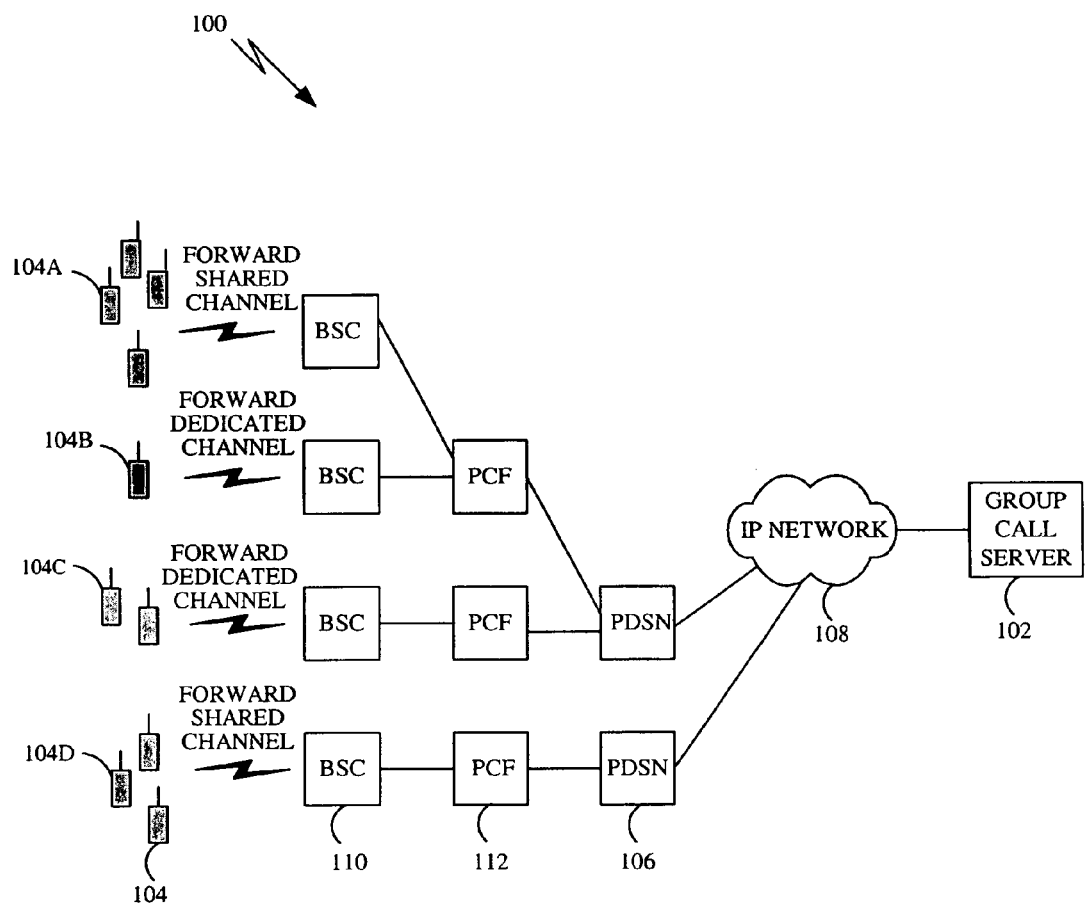
FIG. 1 illustrates a group communications system.

Before several embodiments are explained in detail, it is to be understood that the invention is not limited in its application to the details of the construction and the arrangement of the components set forth in the following description or illustrated in the drawings. The invention is capable of being implemented in other embodiments and carried out in various ways. Also, it should be understood that the phraseology and terminology used herein is for purpose of description and should not be regarded as limiting.

FIG. 1 illustrates a functional block diagram of a group communication system 100, according to one embodiment. The group communication system 100 is also known as a push-to-talk (PTT) system, a net broadcast service (NBS), a dispatch system, or a point-to-multi-point communication system. In one embodiment, the group communication system 100 includes a group call server 102, which may be deployed in either a centralized deployment or a regionalized deployment, as described in the copending patent application, U.S. patent application Ser. No. 10/076,726, filed Feb. 14, 2002 (the "'076 application"), which is assigned to the same assignee and is incorporated herein by reference in its entirety.

The group communication devices 104, which may be deployed such as a cdma2000 family of handsets, for example, may request packet data sessions using a data service option.

Each communication device may use the session to register the communication device's IP address with group call server 102 to perform group call initiations. In one embodiment, communication devices 104, upon requesting packet data sessions from a wireless infrastructure, may have IP connectivity to group call server 102 through PDSNs 106 and the Internet Protocol (IP) network 108. The PDSNs provide interface between transmission of the data in the fixed network and the transmission of the data over the air interface. Each PDSN may interface to a base station controller (BSC) 110 through a packet control function (PCF) 112, which may be co-located with the BSC.

After powering up, CDs 104 may request packet data sessions using the data service option. As part of establishing the packet data sessions, each CD may be assigned an IP address. Each CD may perform a registration process to notify GCS 102 of the CD's IP address. The registration may be performed using an IP protocol, such as session initiation protocol (SIP) over user datagram protocol (UDP). The IP address of a CD may be used to contact the CD when the corresponding user is invited into a group call. Once a group call is established, CDs 104 and GCS 102 may exchange media and signaling messages. In one embodiment, the media may be sent between the call participants and GCS 102 using real-time protocol (RTP) over UDP. The signaling messages may be also signaling protocol over UDP.

The group communication system 100 performs several different functions in order to operate the group services. The functions that relate to user side include user registration, group call initiation, group call termination, sending alerts to group members, late join to a group call, talker arbitration, adding members to a group, removing members from a group, un-registering a member, and authentication. The functions that relate to system preparation and operation include administration and provisioning, scalability, and reliability. These functions are described in detail in the '076 application, described above.

Figure 2:
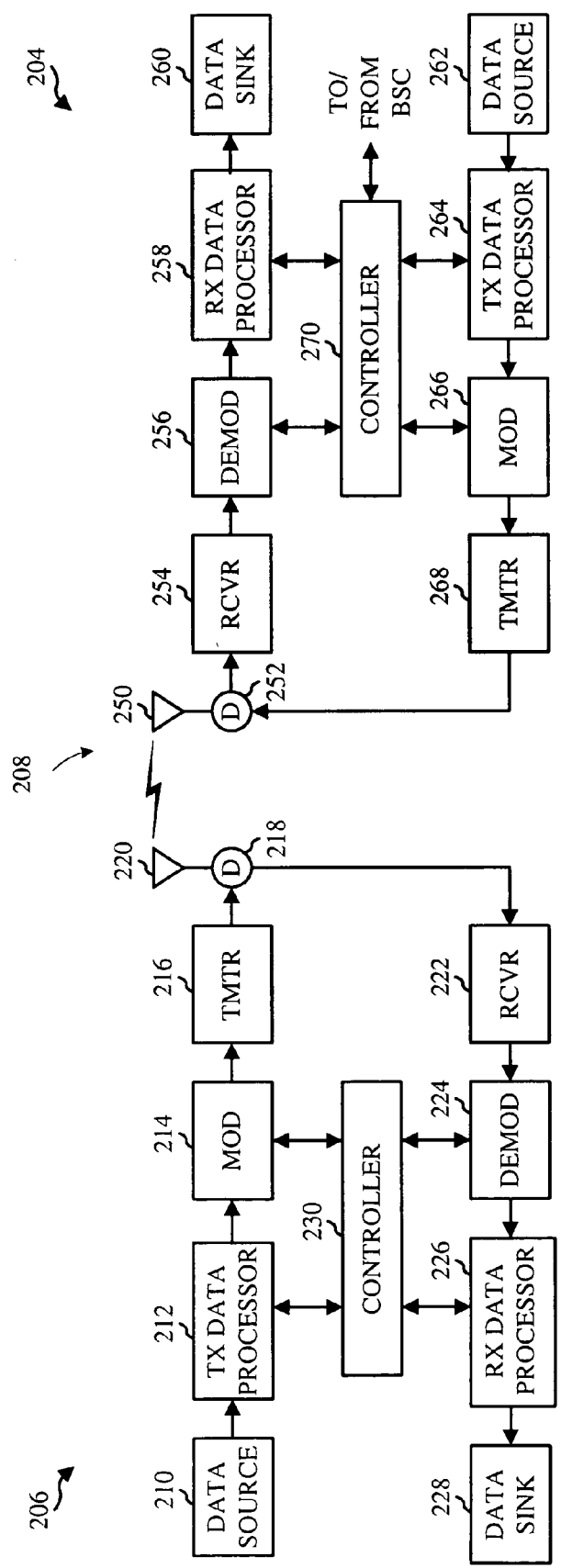
FIG. 2 illustrates an embodiment for a base station and a mobile station in FIG. 1.

FIG. 2 is a simplified block diagram of an embodiment of base station 204 and mobile station 206, which are capable of implementing various disclosed embodiments. For a particular communication, voice data, packet data, and/or messages may be exchanged between base station 204 and mobile station 206, via an air interface 208. Various types of messages may be transmitted, such as messages used to establish a communication session between the base station and mobile station, registration and paging messages, and messages used to control a data transmission (e.g., power control, data rate information, acknowledgment, and so on). Some of these message types are described in further detail below.

For the reverse link, at mobile station 206, voice and/or packet data (e.g., from a data source 210) and messages (e.g., from a controller 230) are provided to a transmit (TX) data processor 212, which formats and encodes the data and messages with one or more coding schemes to generate coded data. Each coding scheme may include any combination of cyclic redundancy check (CRC), convolutional, turbo, block, and other coding, or no coding at all. The voice data, packet data, and messages may be coded using different schemes, and different types of messages may be coded differently.

The coded data is then provided to a modulator (MOD) 214 and further processed (e.g., covered, spread with short PN sequences, and scrambled with a long PN sequence assigned to the user terminal). The modulated data is then provided to a transmitter unit (TMTR) 216 and conditioned (e.g., converted to one or more analog signals, amplified, filtered, and quadrature modulated) to generate a reverse link signal. The reverse link signal is routed through a duplexer (D) 218 and transmitted via an antenna 220 to base station 204.

At base station 204, the reverse link signal is received by an antenna 250, routed through a duplexer 252, and provided to a receiver unit (RCVR) 254. Base station 204 may receive registration information and status information, e.g., mobile station mobility rate, from mobile station 206. Receiver unit 254 conditions (e.g., filters, amplifies, down converts, and digitizes) the received signal and provides samples. A demodulator (DEMOD) 256 receives and processes (e.g., despreads, decovers, and pilot demodulates) the samples to provide recovered symbols. Demodulator 256 may implement a rake receiver that processes multiple instances of the received signal and generates combined symbols. A receive (RX) data processor 258 then decodes the symbols to recover the data and messages transmitted on the reverse link. The recovered voice/packet data is provided to a data sink 260 and the recovered messages may be provided to a controller 270. Controller 270 may include instructions for paging a group of mobile stations, sending radio parameters to the mobile stations, and binding the mobile stations to a multicast group. The processing by demodulator 256 and RX data processor 258 are complementary to that performed at mobile station 206. Demodulator 256 and RX data processor 258 may further be operated to process multiple transmissions received via multiple channels, e.g., a reverse fundamental channel (R-FCH) and a reverse supplemental channel (R-SCH). Also, transmissions may be simultaneously from multiple mobile stations, each of which may be transmitting on a reverse fundamental channel, a reverse supplemental channel, or both.

On the forward link, at base station 204, voice and/or packet data (e.g., from a data source 262) and messages (e.g., from controller 270) are processed (e.g., formatted and encoded) by a transmit (TX) data processor 264, further processed (e.g., covered and spread) by a modulator (MOD) 266, and conditioned (e.g., converted to analog signals, amplified, filtered, and quadrature modulated) by a transmitter unit (TMTR) 268 to generate a forward link signal. The forward link signal is routed through duplexer 252 and transmitted via antenna 250 to mobile station 206. Forward link signals include paging signals.

At mobile station 206, the forward link signal is received by antenna 220, routed through duplexer 218, and provided to a receiver unit 222. Receiver unit 222 conditions (e.g., down converts, filters, amplifies, quadrature modulates, and digitizes) the received signal and provides samples. The samples are processed (e.g., despreaded, decovered, and pilot demodulated) by a demodulator 224 to provide symbols, and the symbols are further processed (e.g., decoded and checked) by a receive data processor 226 to recover the data and messages transmitted on the forward link. The recovered data is provided to a data sink 228, and the recovered messages may be provided to controller 230. Controller 230 may include instructions for registering mobile station 206, requesting a group call, and sending media to the base stations 204.

The group call service (GCS) may allow one user to talk to a group of users in a half-duplex or full-duplex mode. In the former case, because only one person may be permitted to talk at a time, the permission to talk may be moderated by the infrastructure. In such systems, a user may request permission to talk by pressing a "push-to-talk" button (PTT), for example. The system may arbitrate the requests received from multiple users and, through a contention-resolution process, the system may choose one of the requestors according to a predetermined algorithm. The system may then notify the chosen user that the user has permission to talk. The system may transparently dispatch the user's traffic information, such as voice and/or data, from the authorized talker to the rest of the group members, who may be considered "listeners." The voice and/or data traffic in GCS may be different from the classical one-to-one phone call, and a priority may be placed on some conversations.

Figure 3:
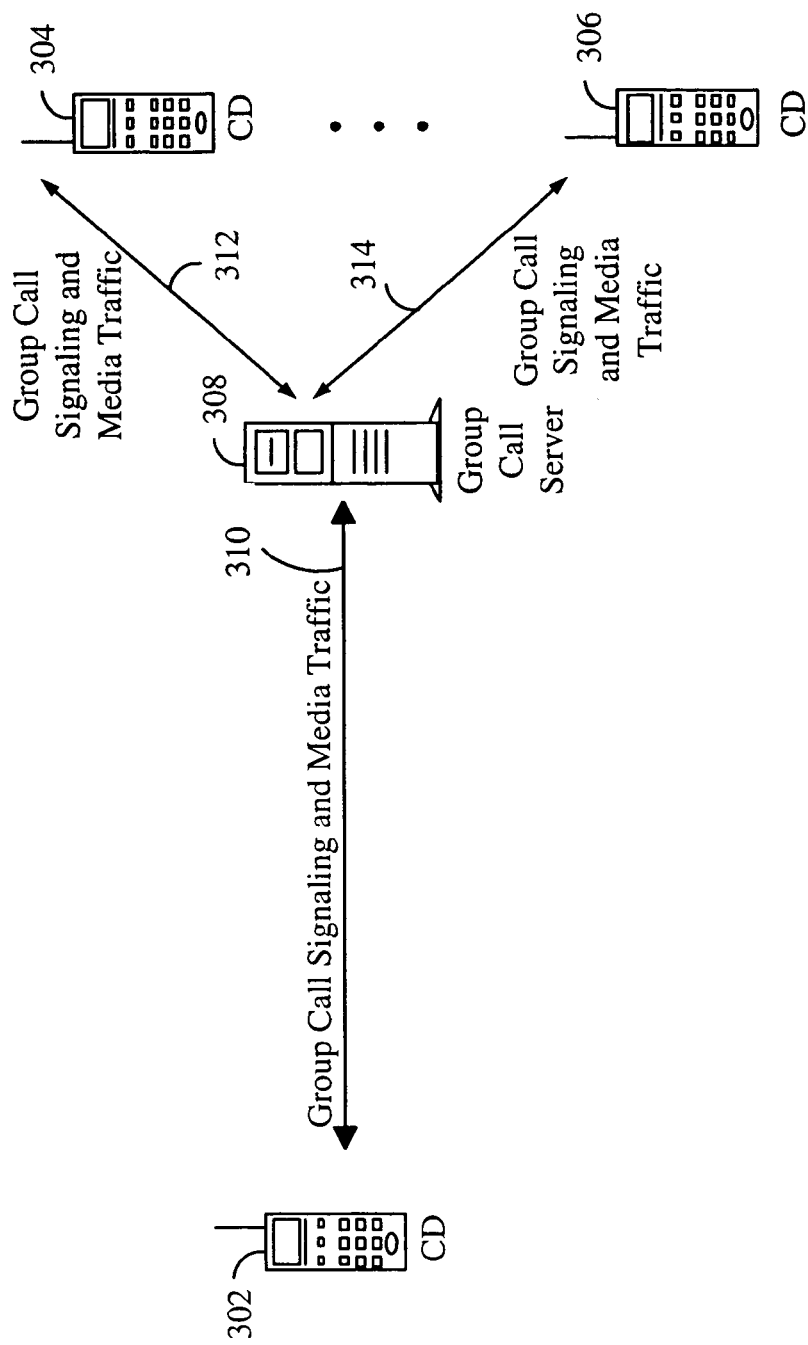
FIG. 3 illustrates how several communication devices interact with a group call server.

FIG. 3 illustrates a group call arrangement for showing how CDs 302, 304, and 306 interact with a group call server 308. Multiple group call servers may be deployed as desired for large-scale groups. In FIG. 3, when CD 302 has permission to transmit media to other members of the group, CD 302 is known as the talker and may transmit media over an established channel. When CD 302 is designated as the talker, the remaining participants, CD 304 and CD 306, may not have permission to transmit media to the group. Accordingly, CD 304 and CD 306 are designated as listeners. As described above, CDs 302, 304, and 306 are connected to group call server 308, using at least one channel. In one embodiment, the channel may include a session initiation protocol (SIP) channel, a media-signaling channel, and a media traffic channel.

Figure 4:
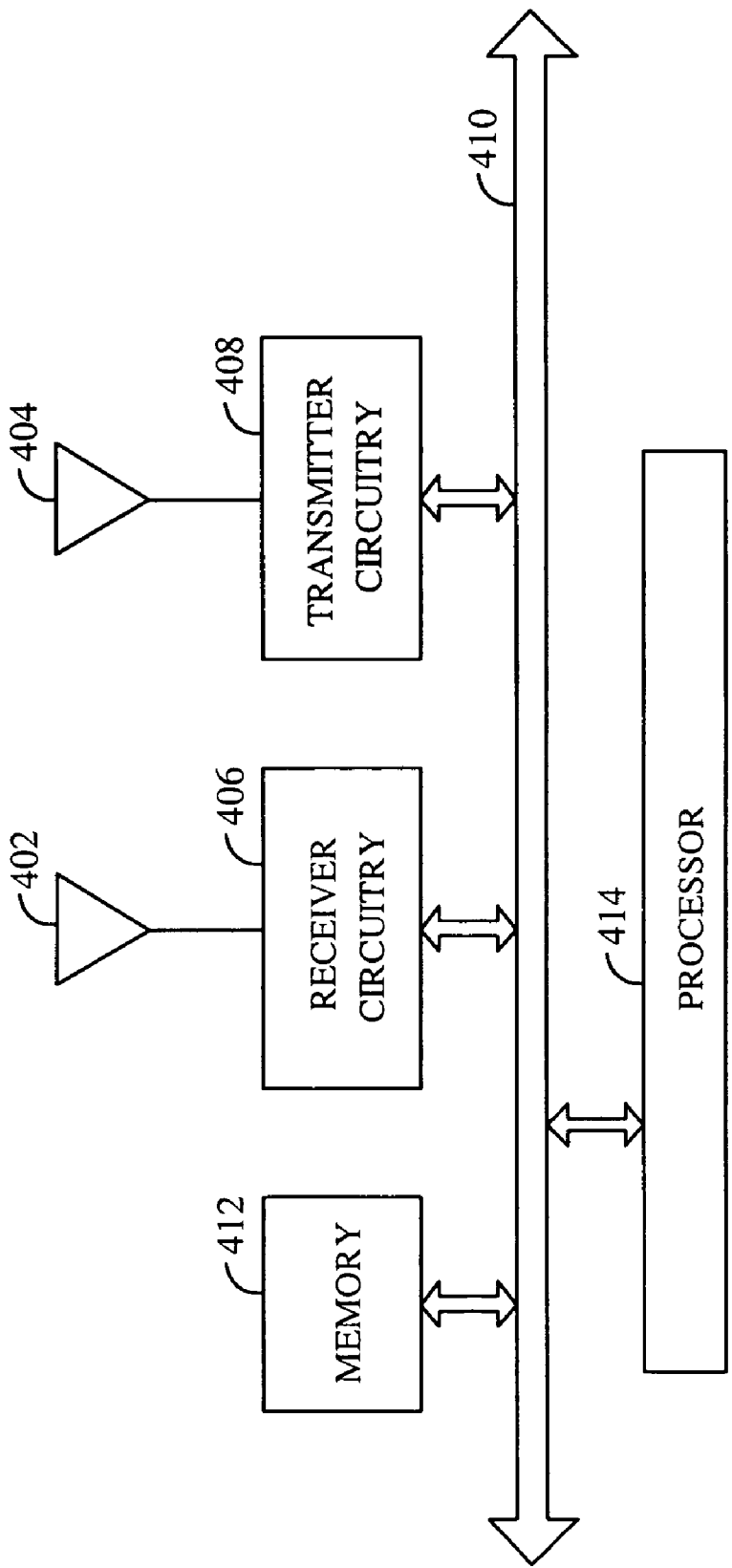
FIG. 4 illustrates one embodiment for the group call server operating in FIG. 1.

FIG. 4 illustrates one embodiment for the group call server 102 operating in system of FIG. 1. The group call server includes antennas 402, 404 for transmitting and receiving data. Antenna 402 is coupled to the receiver circuitry 406 and antenna 404 is coupled to the transmit circuitry 408. Communication bus 410 provides a common connection among other modules in FIG. 4. Communication bus 410 is further coupled to memory unit 412. Memory 412 stores computer readable instructions for a variety of operations and functions performed by the group call server. The processor 414 performs the instructions stored in memory 412.

In a group communication system, as shown in FIG. 1, for example, a large number of group participants are usually concentrated in a small geographical area, e.g., a construction site. Setting up multiple point-to-point communication links for all participants that may be located in a single sector may not be feasible. The group participants may "hog" up all available resources in that sector. This would cause a very high call-blocking rate experienced by other users who do not belong to the group. In addition, if the concentration of the group participants is high in a given sector, the network may not have enough resources to assign a dedicated channel to every group participant. Therefore, users may be denied access to the group call not because of having membership problems but because of lack of available network resources. This problem creates a negative impact on the group call users.

According to one embodiment, media multicasting mechanism reduces network traffic, because the media multiplexing mechanism eliminates the need for establishing individual traffic channels between the group call server and each member of the group of target communication devices. The mechanism also eliminates media replication by the group call server for transmission to all members of the target group. In one embodiment, one copy of the media may be sent to a group address, and the underlying wireless infrastructure may replicate the media at the wireless infrastructure hops where the path to different group members diverges. Since the group call server transmits one copy of media, and the media is replicated at the network hop when it is needed, network traffic on both the wireless infrastructure RAN and service provider's WAN is significantly reduced.

Figure 5:
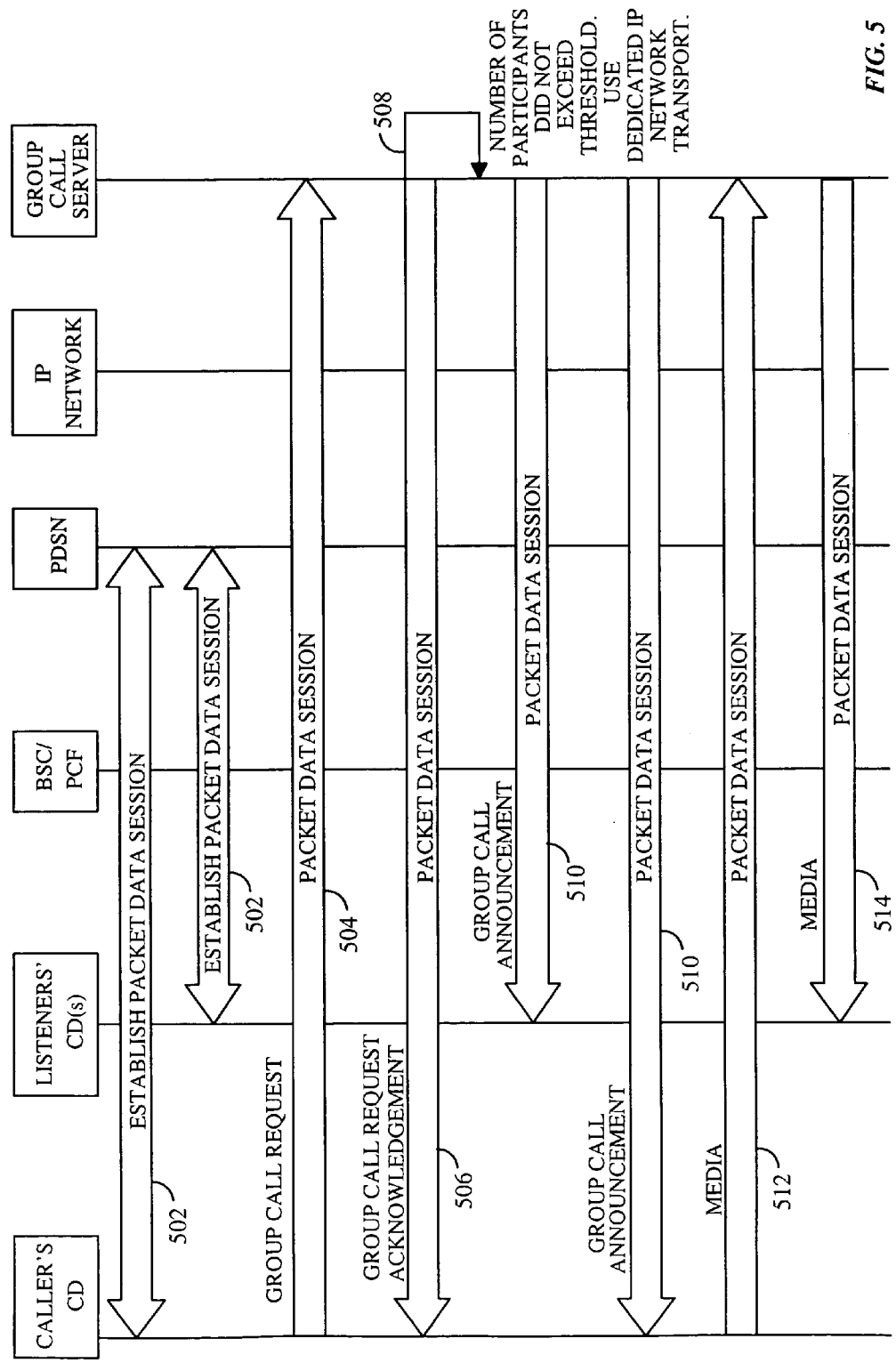
FIG. 5 illustrates a call-setup process according to a first embodiment.

In one embodiment, activation of application-layer media multicasting depends on whether the communication is one-to-one or one-to-many (group). In another embodiment, in a group communication service, activation of application-layer media multicasting depends on the number of participants in the target group. FIG. 5 illustrates a call setup process according to a first embodiment, where there may be only two participants in a group, e.g., one-to-one call, or the number of participants in the target group is lower than a predetermined threshold required for activating a application-tion-layer media multicasting mechanism.

A user who wishes to initiate a group call may select one or more target users, one or more pre-defined groups, or a combination of the two, and may depress the push-to-talk (PTT) button to initiate the group call. The participants in the target group may be in dormant packet data session when the caller initiates the group call. The participating CDs establish packet data sessions 502 and perform the necessary registrations, as described in the above-mentioned copending patent application. The caller's CD may use the established packet data session to send a group call request 504 to the group call server to setup the group call. The group call request may be transmitted to the group call server regardless of whether the caller's CD has a dedicated traffic channel or not, as described in the copending patent application, U.S. patent application Ser. No. 10/006,037, filed Dec. 4, 2001, which is assigned to the same assignee and is incorporated herein by reference in its entirety.

In one embodiment, the caller's CD may send the group call request to the group call server on an available channel, without waiting for dedicated channels be established for the caller's CD. In one embodiment, the group call request may be transmitted to the group call server as short data bursts (SDBs). After the request is sent, if the caller's CD is in a dormant packet data session, the caller's CD may initiate the process of re-establishing dedicated traffic channels and prepare the packet data session for media activity.

When the group call server receives the group call request, it may expand the pre-defined groups, if any is specified in the request, into a list of target members. The group call server may retrieve location information, e.g., IP address, for the target members. The group call server may also determine if the desired group is already running in the system.

The group call server may respond with a group call request acknowledgment 506 using the established packet data session. In one embodiment, the group call server determines 508 whether the number of participants in the target group meets a required threshold for activating application-layer media multicasting mechanism. If the number of participants in the target group does not meet the required threshold, the group call server may send group call announcements 510 to the caller's CD as well as to the listeners' CD(s) on the established packet data sessions.

The group-call announcements 510 may include information indicating that the group call server may use unicast mechanism, in which the group call server may use the established packet data sessions for transporting the media to the group members. This may require the group call server to replicate and send a copy of the media to each individual group member, but saves time in setting up a multicast tree for a one-to-one call or a group call with low number of participants. The group call server may receive media 512 from the caller's CD and forward the received media 514 to the listeners' CD(s), on the established packet data sessions.

Figure 6:
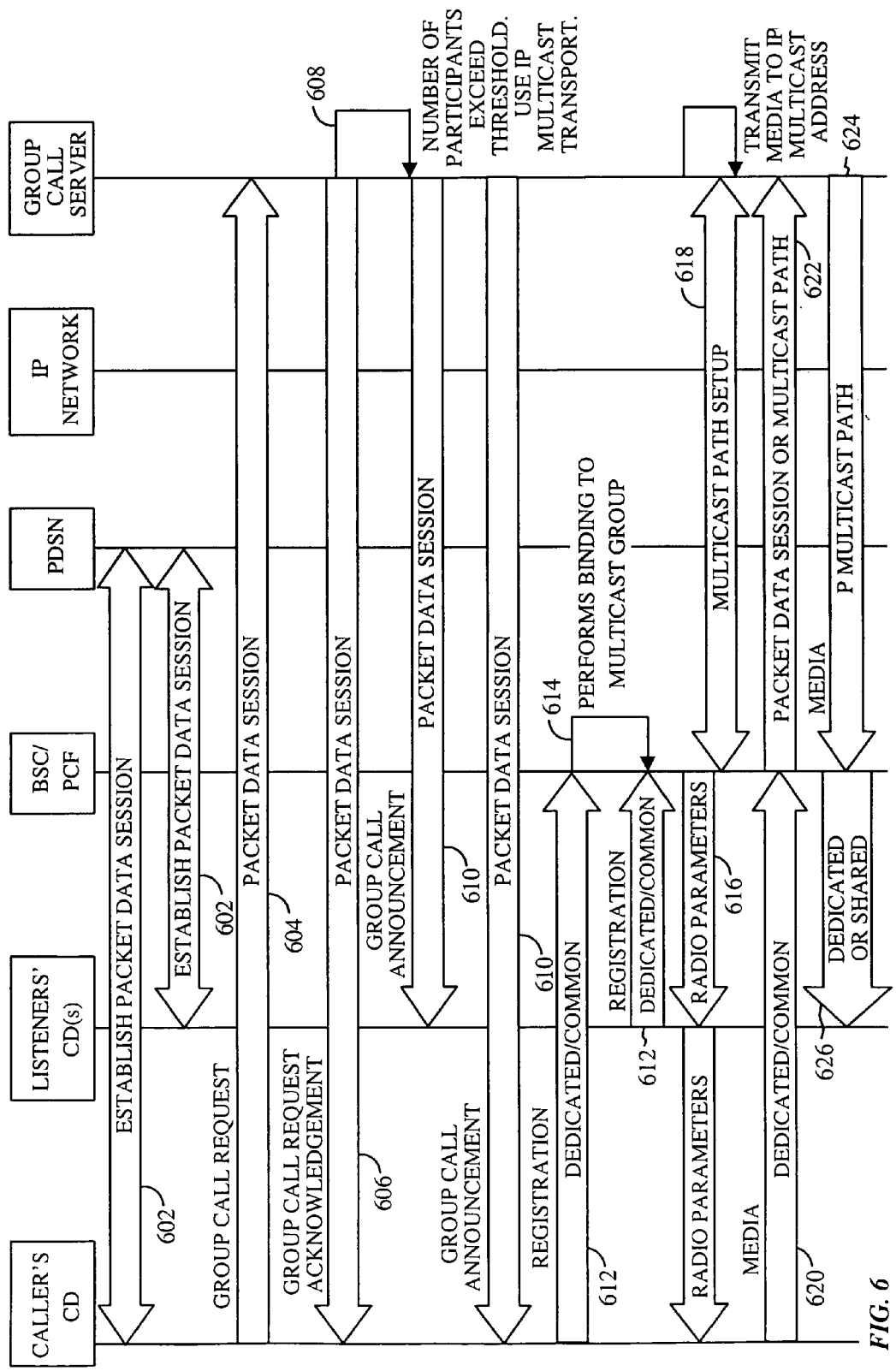
FIG. 6 illustrates a call-setup process according to a second embodiment.

FIG. 6 illustrates a call-setup process according to one embodiment, where the number of group participants exceeds the predetermined threshold required to activate the application-layer media multicasting mechanism. As discussed in connection with FIG. 5, after establishing packet data sessions 602, the caller's CD may send a group call request 604 to the group call server to setup the group call. When the group call server receives the group call request 604, the group call server may respond with a group call request acknowledgment 606.

In one embodiment, the group call server may use the established packet data session for sending the respond. The group call server may determine 408 the number of participants in the target group. If the number of participants in the target group exceeds the required threshold, the group call server may use an IP media multicasting mechanism to deliver the media that it receives from the caller's CD to the target listeners' CDs. The group call server may send group call announcements 610 to the caller's CD as well as to the listeners' CDs on the established packet data sessions. The group call announcements 610 that are sent from the group call server to the group participants may include information indicating that the group call server may utilize IP media multicasting mechanism to save network resources.

The group call announcement may also contain information indicating that the target group members may need to bind with the requested group call. Such information may include the IP-multicast address and/or some multicast service identifier. In one embodiment, the group call server may query another network component to obtain an IP multicast address for use with the target group call. In one embodiment, the group call server may be assigned with a pool of IP multicast addresses to use for group communications. The IP multicast address may be returned back to the pool when a group call is over.

After receiving the group call announcements, each participating CD may perform a registration process 612 with the wireless infrastructure. The registration process 612 may be performed over a dedicated channel, e.g., reverse fundamental channel (R-FCH), or a common channel, e.g., reverse enhanced access channel (R-EACH) or reverse access channel (R-ACH). The registration messages may inform the BSC that the participating CDs are willing to participate in a group call. The registration messages may also include information identifying the cell and/or sector each participating CD is located in. The registration messages may also contain the IP multicast address, multicast service identifier, and other network parameters, which the participating CD may have received from the group call server.

The BSC may bind 614 the registered participating CDs with the multicast IP-multicast address of the target group. In one embodiment, the BSC binds each registered participating CD with the IP-multicast address through an individual dedicated channel. This may happen if the count of the registered participating CDs in a cell and/or sector is less than a predetermined number, or the registered participating CDs are sparsely located in more than one cell and/or sector. For example, if the target listeners' CDs are situated as CDs 104B or 104C shown in FIG. 1, the respective BSCs may bind such CDs with the IP multicast address via dedicated channels.

In one embodiment, the BSC maps the registered participating CDs to the IP-multicast address through a shared channel. This may happen if the count of the registered participating CDs in a cell and/or sector is more a predetermined number, or the registered participating CDs are located in one cell and/or sector. For example, if the target listeners' CDs are situated as CDs 104A or 104D shown in FIG. 1, the respective BSCs may map such CDs with the IP multicast address via a shared channel. In one embodiment, the BSC has the shared forward channel capability, if there is a physical layer channel, such as a forward broadcast control channel (F-BCCH), a forward common control channel (F-CCCH), a forward paging channel (F-PCH), or a forward supplemental channel (F-SCH), for delivering group-call media to the group of target listeners.

The BSC may broadcast or individually send some radio parameter 616 to the participating CDs as overhead messages for some period of time. The BSC may forward such parameters to each cell and or sector separately. The radio parameters may include information indicating whether the target CDs are bound to the IP-multicast address via dedicated channels or a shared channel. In one embodiment, the BSC may send the radio parameters on a forward broadcast control channel (F-BCCH), a forward paging channel (F-PCH), or a forward common control channel (F-CCCH). Alternatively, the BSC may send the radio parameters directly to the participating CDs on existing packet data sessions.

In one embodiment, the participating CDs that have received the radio parameters but have not yet registered with the corresponding BSC may need not register with the BSC, if the BSC has indicated in the radio parameters that the BSC has mapped a shared channel to the cells and/or sectors where such unregistered participating CDs are located in. However, the unregistered participating CDs need to register with the corresponding BSC, if the BSC has indicated in the radio parameters that the BSC has mapped dedicated channels to the cells and/or sectors where such unregistered CDs are located in.

The BSC may then set up a multicast path 618 between the BSC and the group call server, as described in the copending patent application, U.S. patent application Ser. No. 10/011,526, filed Nov. 5, 2001, which is assigned to the assignee and is incorporated herein by reference in its entirety.

After receiving the group call announcement and successfully registering with the BSC, the caller's CD may send media 620 to the group call server on a reverse dedicated channels, e.g., reverse supplemental channel (R-SCH), reverse dedicated control channel (R-DCCH), or reverse fundamental channel (R-FCH). Alternatively, the caller's CD may use reverse common channels, e.g., reverse enhanced access channel (R-EACH) or reverse access channel (R-ACH) to communicate with the BSC. In either case the existing packet data sessions may be put in dormant mode. The BSC may send the media 622 that the BSC has received from the caller's CD to the group call server using the established packet data sessions or the multicast path.

The group call server may use the IP-multicast address and multicast one copy of the media on the established IP-multicast path 624 to the relevant BSC(s). The media follows the multicast path 624 and arrives at those BSCs that have established the multicast path for the same IP-multicast address. In one embodiment, the BSC may need to replicate the media it has received from the group call server for transmission to the target listeners' CDs. This happens if the IP-multicast address is mapped to the target CDs via dedicated traffic channels, such as in the case of CDs 104B or 104C illustrated in FIG. 1, for example.

The BSC may send one copy of the media 626 to each target listener's CD that is mapped to the IP-multicast address via a dedicated channel on such established dedicated channel. The BSC may also send one copy of the media 626 to the target listeners' CDs that are mapped to the IP-multicast address via a shared channel.

In one embodiment, the BSC may set up the forward traffic channel as shared forward channel regardless of the number of participants in the group call. The BSC may indicate, in a message to the participating CDs, that the BSC may broadcast radio parameters to the participating CDs. The participating CDs that receive the message but may have not performed registration may need not to register anymore. To receive the group call media, such CDs may tune to the radio parameters specified in the message, which advantageously prevent flooding of registration messages sent on the common reverse link, and hence reduce the number of unnecessary registration messages processed by the BSC.

In one embodiment, the BSC may set up the forward traffic channel as shared forward channel if the number of registration messages that the BSC receives from a given cell or sector exceeds a given threshold. If the number of registration messages the BSC receives from a cell or sector is lower than the threshold, the BSC may transmit the media to each participating CD on a dedicated channel. The BSC may send out a message to each or some of the participating CDs, indicating that the BSC may use either the shared channel or the dedicated forward channel.

In one embodiment, the group communication system 100 supports both the chat-room model and the ad-hoc models for group call services. In the chat-room model, the groups are pre-defined, which may be stored on the group call dispatch server. The pre-defined groups, or nets, may be public, implying that the group has an open member list., i.e. any CD may join the group. In this case, each group member dispatch user is a potential participant in a group call. In the chat-room model, the group call is started when a first group member opts to initiate join a group call. The call remains running, with server resources assigned to the call, regardless of talk activity, for a pre-determined amount of time period, which may be configured by the service provider. During a group call, the group members may specifically request to join and/or leave these types of calls. During periods of talk inactivity, each group call may be brought into a group dormant state, as will be discussed later, until a group member requests permission to talk. When operating in the chat-room model, a group of communication device users, also known as net members, communicate with one another using a communication device assigned to each net member. The term "net" denotes a group of communication device users authorized to communicate with each other.

In the ad-hoc model of group call services, however, groups may be defined in real-time and have a closed member list associated with each group. A closed member list may specify which members are allowed to participate in the group call. The member list, may not be available to other users outside the closed member list, and may only exist for the life of the call. Ad-hoc group definitions may not be stored in the group call server. The definitions may be used to establish the group call and released after the call has ended. An ad-hoc group may be formed when an originating talker selects one or more target members and generates a group call request, which is sent to the group call server to start the call. The group call server may send a notification to the target group members that they have been included in the group. The group call server may automatically join the target members into the group call, i.e., no user action may be required from the target members.

When an ad-hoc call becomes inactive, the group communication server may "tear down" the call and free the resources assigned to the group, including the group definition used to start the call. In one embodiment, after a period of inactivity, the BSC may release the traffic channel, e.g., shared and/or dedicated traffic channels, but keep the multicast path still active. However, after an extended period of inactivity, the BSC and/or wireless network infrastructure may trigger a multicast group leave, such as an Internet group management protocol (IGMP), and thereby tear down the multicast tree. This may prevent the wireless network infrastructure's RAN and/or the service provider's WAN, from maintaining connections with those group call sessions that have ended due to network or group call server failures.

Therefore, the disclosed embodiments provide for a significant reduction in network traffic and media processing time by transmitting media in an IP-multicasting mode, where a single copy of the media destined for a group of target recipients is transmitted to a wireless infrastructure over a single multicast path. The wireless infrastructure replicates and transmits one copy of the received media to each target recipient that is assigned to a dedicated channel. However, the wireless infrastructure transmits one copy of the received media to those target recipients that are assigned to a shared channel.

Those of skill in the art would understand that information and signals may be represented using any of a variety of different technologies and protocols. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments. Although several embodiments of the invention is explained in connection with some exemplary group call services, it is to be understood that the invention is not limited in its application to the details of the construction and the arrangement of the components set forth in the disclosed description or illustrated in the drawings. The invention is capable of being implemented in other embodiments and carried out in various ways, for example, in an instant messaging service or any general wireless data communication applications.

The invention claimed is:

1. A method for multicasting media to a group of target communication devices in a wireless communication network, the wireless communication network including a wireless infrastructure and a group call server (GCS), the method comprising:
    multicasting one copy of the media from the GCS to the wireless infrastructure for transmission to the group of target communication devices;
    transmitting one copy of the media from the wireless infrastructure to each of a first plurality of target communication devices within a first zone;
    multicasting one copy of the media from the wireless infrastructure to a second plurality of target communication devices within a second zone;
    replicating, by the wireless infrastructure, the media for transmission to said each of the first plurality of target communication devices; and
    wherein said transmitting to each of the first plurality of target communication devices includes transmitting one copy of the media on a forward dedicated channel of the wireless infrastructure.

2. A computer-readable medium embodying a method for multicasting media to a group of target communication devices in a wireless communication network including a wireless infrastructure and a group call server (GCS), the method comprising:
    multicasting one copy of the media from the GCS to the wireless infrastructure for transmission to the group of target communication devices;
    transmitting one copy of the media from the wireless infrastructure to each of a first plurality of target communication devices within a first zone;
    multicasting one copy of the media from the wireless infrastructure to a second plurality of target communication devices within a second zone;
    replicating, by the wireless infrastructure, the media for transmission to said each of the first plurality of target communication devices; and
    wherein said transmitting to each of the first plurality of target communication devices includes transmitting one copy of the media on a forward dedicated channel of the wireless infrastructure.

3. An apparatus for multicasting media to a group of target communication devices in a wireless communication network including a wireless infrastructure and a group call server (GCS), comprising:
    means for multicasting one copy of the media from the GCS to the wireless infrastructure for transmission to the group of target communication devices;
    means for transmitting one copy of the media from the wireless infrastructure to each of a first plurality of target communication devices within a first zone;
    means for multicasting one copy of the media from the wireless infrastructure to a second plurality of target communication devices within a second zone;
    replicating, in the wireless infrastructure, the media for transmission to said each of the first plurality of target communication devices;
    wherein said means for transmitting to each of the first plurality of target communication devices includes means for transmitting one copy of the media on a forward dedicated channel of the wireless infrastructure.

4. An apparatus for multicasting media to a group of target communication devices in a wireless communication network, comprising:
    a memory unit;
    a receiver;
    a transmitter; and
    a processor coupled to the memory unit, the receiver, and the transmitter, the processor being capable of:
    multicasting one copy of the media from the GCS to the wireless infrastructure for transmission to the group of target communication devices;
    transmitting one copy of the media from the wireless infrastructure to each of a first plurality of target communication devices within a first zone;
    multicasting one copy of the media from the wireless infrastructure to a second plurality of target communication devices within a second zone;
    replicating, in the wireless infrastructure, the media for transmission to said each of the first plurality of target communication devices; and
    wherein said transmitting to each of the first plurality of target communication devices includes transmitting one copy of the media on a forward dedicated channel of the wireless infrastructure.

* * * * *